(12) United States Patent
Bhattacharya et al.

(10) Patent No.: US 7,720,107 B2
(45) Date of Patent: May 18, 2010

(54) ALIGNING DATA IN A WIDE, HIGH-SPEED, SOURCE SYNCHRONOUS PARALLEL LINK

(75) Inventors: Dipankar Bhattacharya, Saratoga, CA (US); Bangalore Priyadarshan, Fremont, CA (US); Jaushin Lee, Saratoga, CA (US); François Gautier-Le Boulch, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1103 days.

(21) Appl. No.: 10/989,703

(22) Filed: Nov. 15, 2004

(65) Prior Publication Data

US 2005/0066142 A1    Mar. 24, 2005

Related U.S. Application Data

(63) Continuation-in-part of application No. 10/462,866, filed on Jun. 16, 2003, now Pat. No. 7,047,385.

(51) Int. Cl.
*H04J 3/06* (2006.01)
*G06F 1/04* (2006.01)

(52) U.S. Cl. .............. 370/503; 370/498; 370/464; 370/60; 713/503; 716/6

(58) Field of Classification Search .......... 370/503, 370/498, 464, 60, 535, 473, 506, 507, 508, 370/509, 521, 529; 714/700; 713/503, 401, 713/14; 711/169; 375/371, 356, 360; 326/21, 326/62; 716/6
See application file for complete search history.

(56) References Cited

U.S. PATENT DOCUMENTS

| | | | | | |
|---|---|---|---|---|---|
| 5,386,415 | A | * | 1/1995 | Ito et al. | 370/394 |
| 5,734,685 | A | * | 3/1998 | Bedell et al. | 375/356 |
| 6,536,025 | B2 | * | 3/2003 | Kennedy et al. | 716/6 |
| 6,873,178 | B2 | * | 3/2005 | Lee | 326/21 |
| 7,209,531 | B1 | * | 4/2007 | Katz et al. | 375/371 |
| 2002/0184552 | A1 | * | 12/2002 | Evoy et al. | 713/503 |
| 2003/0065987 | A1 | | 4/2003 | Ehmann | |
| 2003/0102892 | A1 | | 6/2003 | Meier | |
| 2004/0249964 | A1 | * | 12/2004 | Mougel | 709/231 |
| 2006/0026449 | A1 | * | 2/2006 | Chiang | 713/503 |

OTHER PUBLICATIONS

Altera Corporation, "Using LVDS in APEX 20KE Devices," White Paper, Jan. 2000, ver. 1, copyright 2000 Altera Corporation, San Jose, CA, downloaded from the Internet: <http://www.altera.com/literature/wp/lvdswp.pdf>.
PCT International Search Report Mailed Oct. 12, 2006.

* cited by examiner

*Primary Examiner*—Aung S Moe
*Assistant Examiner*—Jamal Javaid
(74) *Attorney, Agent, or Firm*—Charles E. Krueger (57) ABSTRACT

A source-synchronous parallel interface divides a wide data bus into clock-groups including a sub-group of the data lines and a clock line carrying a copy of the transmit clock. The traces in a clock-group are located physically close together to minimize skew between the signals carried on the traces of the clock-group. Deskew logic on the receiver compensates for skew between received clock-group signals.

6 Claims, 7 Drawing Sheets

ALIGNING DATA IN A WIDE, HIGH-SPEED, SOURCE SYNCHRONOUS PARALLEL LINK

RELATED APPLICATIONS

This application is a continuation in part of the commonly-assigned United States patent application entitled HIGH-SPEED MEMORY FOR USE IN NETWORKING SYSTEMS, filed Jun. 16, 2003, Ser. No. 10/462,866, which is hereby incorporated by reference for all purposes.

BACKGROUND OF THE INVENTION

The source-synchronous bus has been used to increase the speed of buses in many designs. Data and clock are sourced from the same device on the bus. The receiving device uses the clock from the bus to sample the data on the bus. Since the clock and data are driven and distributed similarly, they have similar delays and hence such buses can be run faster than buses using other clocking schemes.

At higher speed, being able to drive a clock becomes challenging especially when the data pins are driven and sampled on both edges of the clock. This is referred to as double-data rate or DDR.

One of the limitations on speed derives from the fact that as the number of data pins gets large, the skew between those pins increases, where Clock Skew is the variation in the transition point of a clock signal due to delay in the propagation path. Since all pins need to be sampled with the same clock, clock skew limits the speed of the bus. In DDR3, SRAMs, and in fast packet forwarding ASICs, this limitation is overcome by limiting the number of data pins associated with a clock pin. For wider data buses, multiple copies of source-synchronous clocks are used. But still the skew between copies of clocks has to be limited to much less than the clock period in order to align the data sampled with different copies of clocks.

Accordingly, new parallel interfaces need to be developed that allow high speed data transfer between Devices with a large number of pins.

BRIEF SUMMARY OF THE INVENTION

One embodiment of the invention allows the clock period of the transmit and receive core clocks to get smaller than the skew between the copies of source-synchronous clock. The maximum frequency of operation of the link is thereby increased to the limit reachable for sampling a small number of data pins with a source-synchronous clock received on a pair (clock high and clock low) of clock pins. There is no limit imposed because of skew between multiple copies of source-synchronous clocks.

In another embodiment of the invention, for each copy of source-synchronous clock, data is written into a receive-data FIFO in the receiver and data is read from all these FIFOs using a single core clock. An initialization protocol is used to align data between multiple FIFOs. The initialization protocol and the receive-data FIFOs can also be used to align data coming from multiple devices connected in parallel to the same receiving device.

In another embodiment of the invention, both the transmitting and receiving devices use a PLL (phase-locked loop) to phase-align their internal core-clocks with a common external reference clock. This limits the jitter and wander of the source-synchronous clock with respect to the receiver core-clock and that in turn reduces the depth of the receive-data FIFOs.

In another embodiment of the invention, the transmitting device may send data in a single clock from one or more logical buses in its core-clock domain over multiple source synchronous links. The receive-data FIFOs and the deskew protocol align the data from the logical bus(es) in the core-clock domain of the receiving device.

Other features and advantages of the invention will be apparent in view of the following detailed description and appended figures.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Several embodiments will now be described to implement a high-speed source-synchronous parallel link (SSPL) for transferring data at high speed between devices with a large number of pins. The embodiments include features such as multiple clock groups where multiple clock copies are transmitted and a limited number of data pins are associated with each clock signal, a deskew unit that aligns data sampled from different clock groups to a core clock, a clock generation system for forming clean copies of core clocks that have low jitter and noise, etc.

In the following embodiments a synchronous unidirectional parallel interface is described where the interface includes data-pins and clock-pins. All the information is carried on data-pins and the clock-pins toggle at a fixed frequency. This clock is referred to as the SSPL-clock. The receiver uses this clock to sample data received on the data-pins. The set of bits transferred in a clock cycle-time is referred to as a data-word and the link supports the transfer of a continuous stream of data-words, one in each clock cycle-time.

Figure 1:
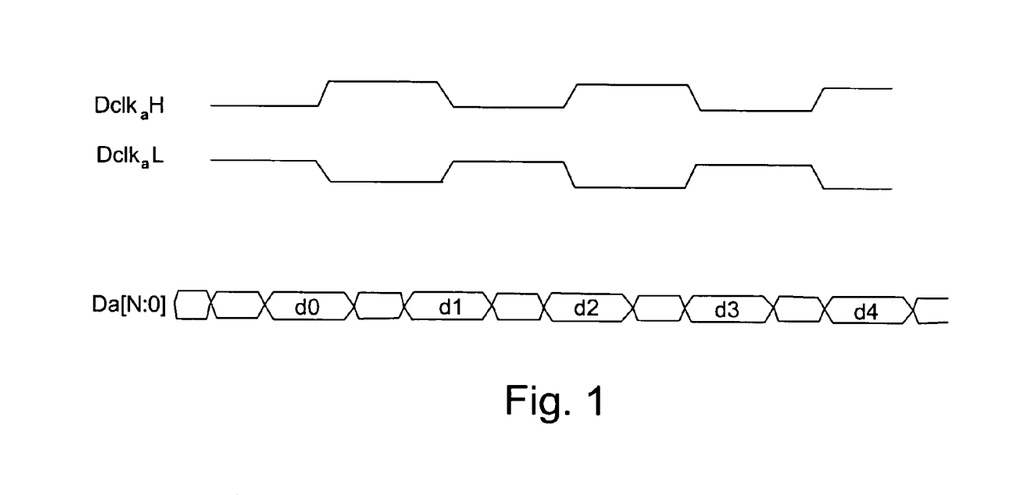
FIG. 1 is a functional timing diagram of an embodiment of the invention.

FIG. 1 is a functional timing diagram of the SSPL of this embodiment where the set of bits transferred in R0 (rising edge of Dclk) and F0 (falling edge of Dclk) form a data word. $Dclk_aH$ (data clock high) and $Dclk_aL$ (data clock low) refer to the high and low edges of the SSPL clock pair and $D_a[N:0]$ is the group of data pins sampled by using clock pair $Dclk_aH$ and $Dclk_aL$. In various embodiments, data can be transferred on rising and falling edge of a single clock, on the rising edges of two complementary clocks, or on the falling edges of two complementary clocks.

In the following, the group of N+1 data pins, referred to as $D_i[N:0]$ is associated with a pair of clock pins, $Dclk_iH$ & $Dclk_iL$. To describe multiple sets of such data and clock pins the letters a, b, and so on are used to replace the subscript "i", e.g., $D_a[N:0]$ associated with $Dclk_aH$ & $Dclk_aL$, $D_b[N:0]$ associated with $Dclk_bH$ & $Dclk_bL$ and so on.

In this embodiment the following design choices are made:
- The SSPL uses source-synchronous clocking, i.e. data-pins and clock-pins are driven from the same source device to minimize skew between the data-pins and clock-pins.
- Each data-pin of the SSPL transfers 2 bits of information in one cycle-time. Thus the maximum frequency of data-pins is the same as that of the clock-pins.
- Data transition is center-aligned with the clock edges.
- All data- and clock-pins are single-ended.
- Clock pins occur in pairs (of opposite phase).

However, a dual clock signal utilizing either differential or complementary logic, can be utilized as is known in the art.

Figure 2:
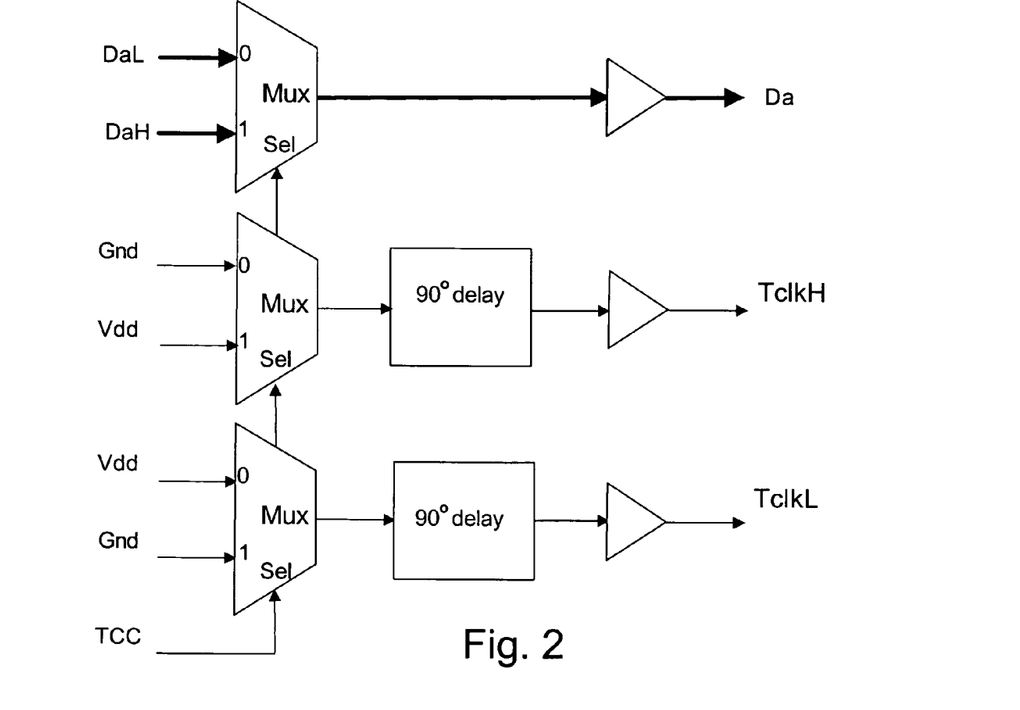
FIG. 2 depicts the transmitter interface model of an embodiment of the invention.
Figure 3:
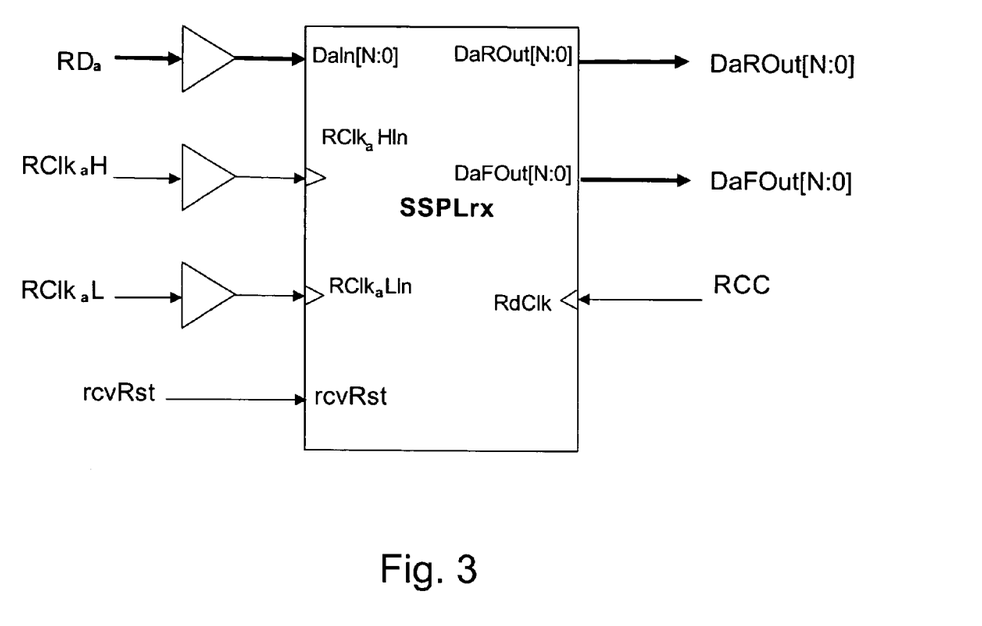
FIG. 3 depicts the receiver interface model of an embodiment of the invention.

FIGS. 2 and 3 depict the transmitter interface model and receiver interface model (SSPLrx). The transmitter and receiver each include a logic and array core that utilizes a transmitter core clock (TCC) and receiver core-clock (RCC) respectively. The transmitter clock (Tclk) is derived from TCC and is transmitted along with the data as a source-synchronous clock. The source synchronous clock is received at the Rclk inputs of the receiver interface. The phase relationship between Rclk and RCC is indeterminate. The receiver interface samples data from the SSPL and transfers it to the receiver core-clock domain.

The $D_aIn[N:0]$ input of the SSPLrx module is sampled with $RclkaHIn$ and $Rclk_aLIn$ clocks. The resultant data is output on $D_aROut[N:0]$ (rising edge) and $D_aFOut[N:0]$ (falling edge) outputs in the RCC clock domain. After initialization, the module continuously samples the input and produces output. The rcvRst input, which is activated by an input pin and/or controlled through a programmable register, initializes the module The design of the SSPLrx module does not depend on phase comparison between the source-synchronous clocks and the receiver core-clock. Such phase difference may change during device operation and cause clock-slip. Therefore, the SSPLrx design uses a synchronization technique that does not depend on phase comparison and is described in greater detail below.

As depicted in FIG. 3, data from the SSPL is clocked in using Rclk and clocked out using RCC.

A technique for synthesizing clean (low-jitter) transmitter and receiver core clocks, where jitter refers to the uncertainty, or variability, of waveform timing, will now be described with reference to FIG. 4.

Figure 4:
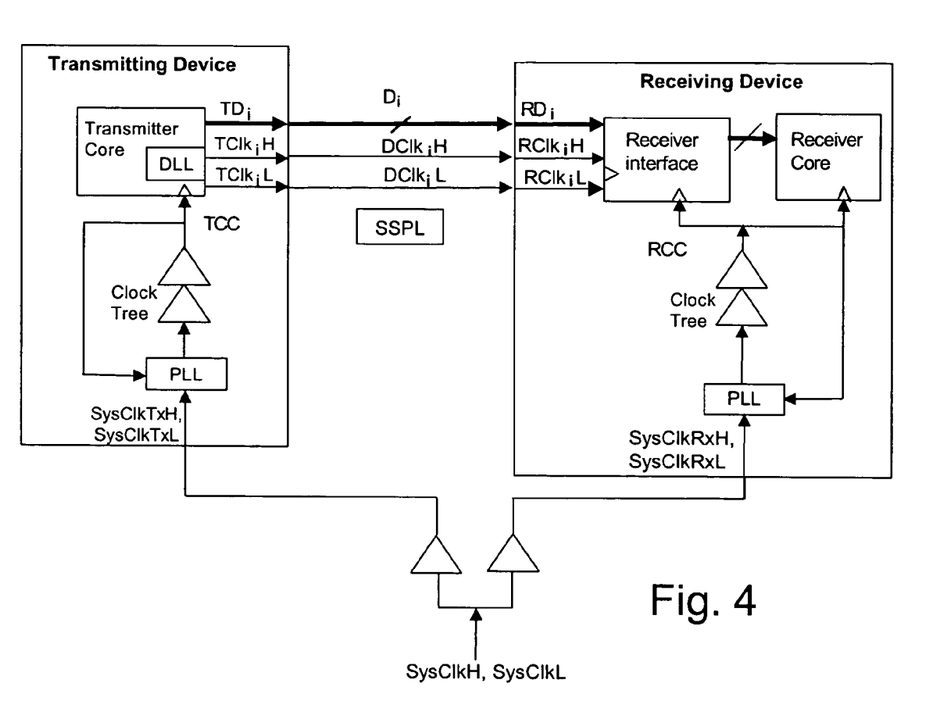
FIG. 4 depicts the clock distributions and clock domains of an embodiment of the invention.

FIG. 4 shows the SSPL clock distribution technique. The transmitting device uses logic that runs at the SSPL-clock frequency or at double that frequency. The clock used for this logic is referred to as the transmitter core-clock. The transmitter core-clock is synthesized from a clean (low-jitter) system clock input to the transmitter device. The leaf of the clock-tree of the transmitter core-clock may be phase-locked to the system clock input and the SSPL-clock is derived from the transmitter core clock.

The receiving device uses logic that runs at the SSPL clock-frequency or at double that frequency. The clock used for this logic is referred to as the receiver core-clock. The receiver core-clock is synthesized from a clean (low-jitter) system clock input to the receiving device. The leaf of the clock tree of the receiver core-clock may be phase-locked to the system clock input.

In this embodiment, the system clock inputs to the transmitting and receiving devices are of the same frequency as the SSPL clock and are copies of a clock from the same source. Also, the transmitter and receiver core-clocks may be phase-locked to the system clock inputs so that the transmitter and receiver clock-tree delays have no effect on the phase difference between the transmitter- and receiver-core clock. Alternatively, the transmitter and receiver core clocks can have different frequencies.

An embodiment that utilizes multiple source-synchronous clock groups will now be described with reference to FIG. 5.

In this embodiment, the number of data-pins associated with a pair of clock pins is limited to between 18 and 20. When bandwidth requirement of the link requires a large number of data-pins, multiple copies of clocks are used. Each pair of clock-pins and the associated data-pins are referred to as a clock-group.

The pins of a clock-group are located physically close to each other in both the transmitting and the receiving device. The transmitter and the traces are carefully designed to minimize skew within a clock group. Though the clocks carried on these pins are derived from the same source, the skew between the clock copies in the different clock-groups may be substantial at the receiver interface.

Figure 5:
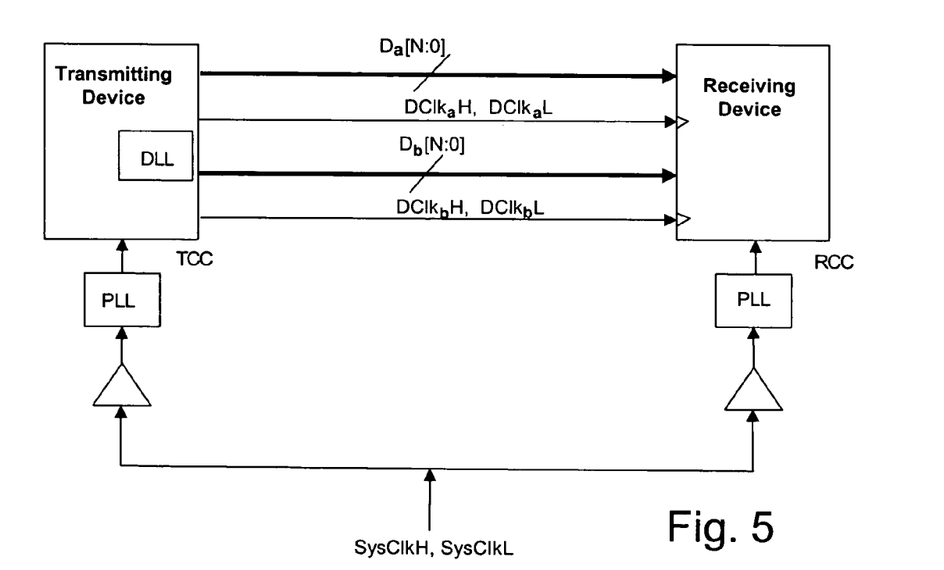
FIG. 5 depicts an embodiment of the invention having a link using two clock-groups.

FIG. 5 depicts an SSPL with two clock groups, referred to as "a" and "b". By dividing the wide bus into source-synchronous clock groups the wide bus is effectively divided up into a series of smaller buses to reduce skew and allow for higher clock speeds.

However, as described above, the different copies of the clock, and associated data signals, in each clock-group may be skewed relative to each other when they arrive at the receiver interface. A system for removing the skew between the signal groups sampled by different received copies of the transmit clock will now be described.

Figure 6:
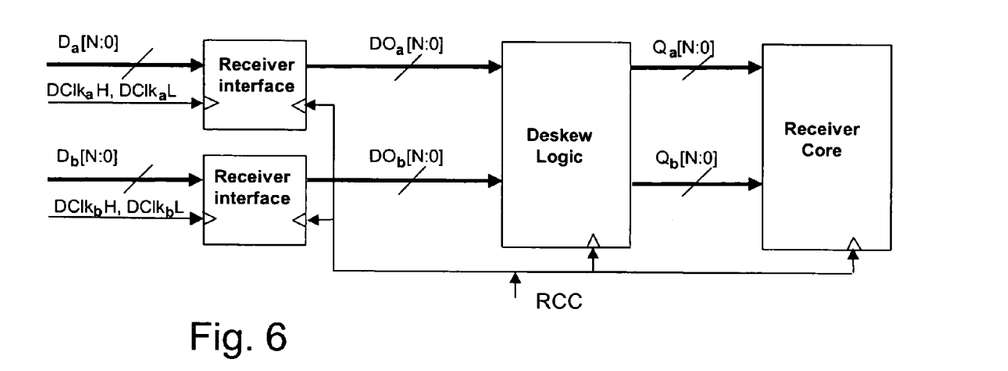
FIG. 6 depicts a receiving device model for multiple clock copies of an embodiment of the invention.

FIG. 6 depicts an embodiment where the receiving device uses a separate copy of the receiver interface module for each clock-group. A deskew logic block is also depicted which aligns the data output from the multiple receiver interfaces and presents it to the receiver core.

The output of the SSPLrx modules in the different receiver interfaces may be skewed with respect to each other due to:
- Skew between copies of SSPL-clocks
- Skew between rcvRst inputs to SSPLrx
- Skew between RCC inputs to SSPLrx In this embodiment, the timing budget limits the maximum skew between the outputs of the different receiver interface modules to one RCC period. Therefore, data from clock-groups that arrive early may need to be delayed by one RCC period in order to align with data from clock-groups that arrive late. However, the invention is not limited by this constraint and the skew between clock groups may be less than, equal to, or greater than the clock period.

In different embodiments the deskew logic may be:
Integrated with receiver interface,
Integrated with receiver core,
Implemented as a separate module.

As depicted in FIGS. 1 and 2, data is clocked on the rising and falling edges of the transmit clock. In this embodiment the period of Tclk and RCC are the same and the first data frame is clocked on TclkH. Therefore, in the example of two clock groups, "a" and "b", skewed by one RCC clock cycle where clock-group a is delayed relative to clock group "b", the data sampled with $Rclk_aH$ could arrive after the data sampled with $Rclk_bL$. The deskewing logic correctly aligns the data presented to the receiver core.

A protocol at device initialization is used to align the edges of the different copies of the SSPL-clock at the receiver. One data pin of each SSPL clock group is used for this purpose and is referred to as the SSPL-Init pin.

Initially the transmitting device drives '0' on the SSPL-Init pin of all clock-groups. This is called the initial-value. Then it drives '1' on the SSPL-Init pin of all the clock-groups (e.g. $D_a[0]$ and $D_b[0]$ in FIG. 5) simultaneously for one SSPL clock period. This value is called the initialization-pattern. The sequence of driving the initial-value followed by the initialization-pattern is referred to as the training sequence. The receiving device detects the transition from initial-value to the initialization-pattern to deskew the data sampled from different clock-groups as described in more detail below.

A first embodiment of the deskew integrated with the receiver interface will now be described with reference to FIG. 7 and FIG. 8.

Figure 7:
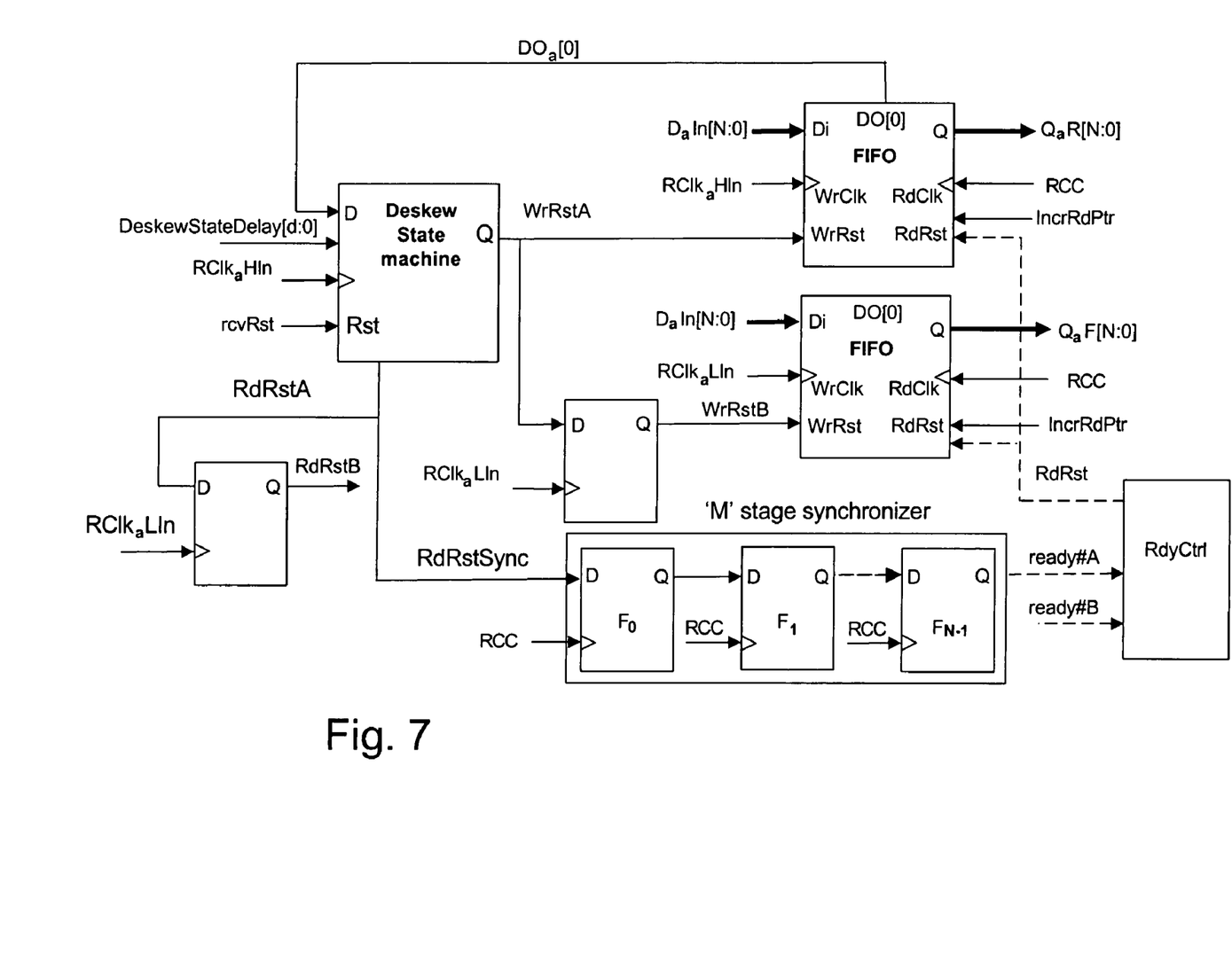
FIG. 7 depicts an embodiment of the invention having deskew logic in the receive interface model.

FIG. 7 is a detailed schematic diagram of an embodiment of the SSPLrx that supports deskewing. FIG. 7 depicts a Deskew State Machine that generates a FIFO Write Restart (WrRst) signal, two FIFOs for buffering data received on the rising and falling edges of Rclk, an M stage synchronizer, and a RdyCtrl block to generate the FIFO Read Restart (RdRst) signal. The data is held for deskewing in the FIFOs inside the SSPLrx module. The delay between writing the first data to the $Rclk_aLIn$-clocked FIFO and reading the same data is established during device initialization and by the delay through synchronizer. In the model represented in FIG. 7, the synchronizer uses 'M' stages of flops clocked with RCC. For other synchronizer structures and core-clock frequencies, the delay through the synchronizer will be different. Depending on that and the timing budget, it may be necessary to have additional delays and/or flops to generate ready#A.

The depth of the FIFOs must be such that the output data is held valid for sufficient time before that entry in the FIFO is overwritten with new data. The maximum time that the write-clock can advance and the maximum synchronizer-delay is factored into deciding the FIFO depth.

After device initialization, the deskew state machine drives the WrRst input of the FIFO high to hold the write-pointer of these FIFOs in the initial state. After detecting the initialization sequence, the deskew state machine drives WrRst low and allows the write-pointer to advance. Thus, the write-pointer and ready# signals in all the SSPLrx modules are controlled by the transmitter interface through the initialization sequence.

In this embodiment, in order to avoid putting extra load on $D_aIn[0]$, the DO[0] input of the deskew state machine is driven from the flop in the FIFO that samples $D_aIn[0]$ during device initialization. This flop in the FIFO must not be held under reset in order to allow propagation of the $D_aIn[0]$ value when WrRst is high.

The output of the deskew logic (Q) is initialized to LOW when the Rst signal is asserted. It then is driven to HIGH and remains HIGH when the training sequence (D[0]=1) is received.

FIG. 7 depicts the deskew logic for clock group "a". This logic is repeated for each clock group. As described above, during the initialization signal a logic "0" signal is driven on the DO[0] signal of each clock group and these signals may be skewed relative to each other. Thus, the time of assertion of WrRst signal will vary from clock group to clock group depending on the amount of relative skew between the clock groups.

Figure 8:
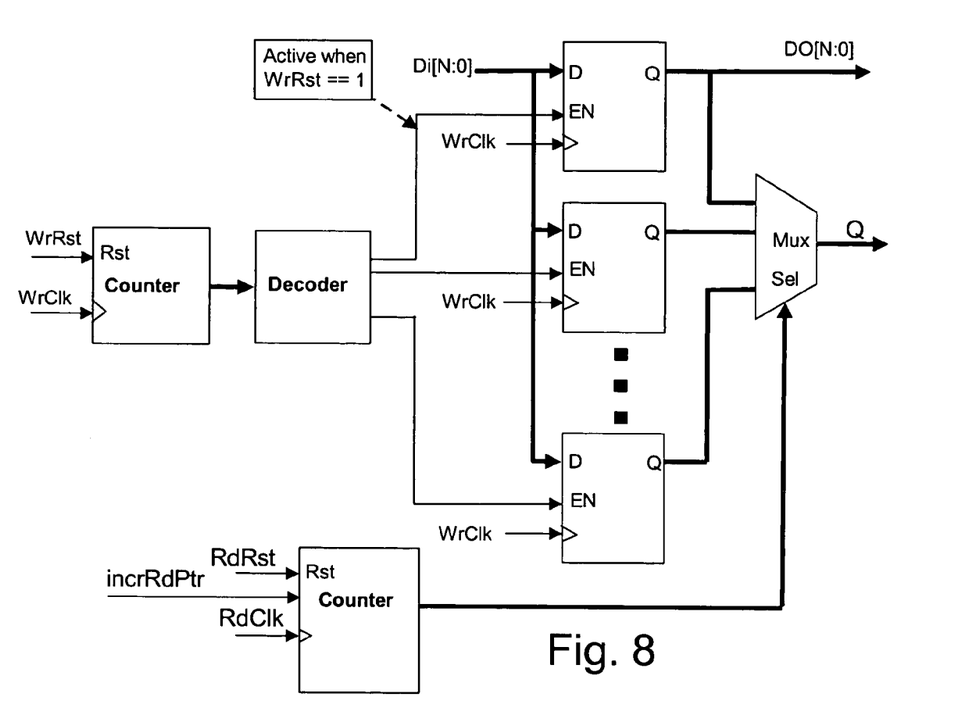
FIG. 8 depicts a FIFO of an embodiment of the invention.

FIG. 8 depicts an embodiment of the FIFO, depicted in FIG. 7, that supports separate read- and write-clocks. The FIFO is deep enough to absorb the skew between the different clock groups. The write-clock is used to write data to the FIFO and advance the write-pointer inside the FIFO. The read-clock is used to sample data from the FIFO and advance the read-pointer inside the FIFO, if (incrRdPtr==1). In implementations where the frequency of the RdClk is a multiple of the frequency of WrClk, the input incrRdPtr is used to control the increment step of the read-pointer. This input is tied to '1' where both clocks are the same frequency.

The WrRst and RdRst to the FIFO counters are active low. When the WrRst input to the FIFO is high, the counter used for the write-pointer inside the FIFO is held in its initial state. Similarly, when the RdRst input to the FIFO is high, the counter used for the read-pointer inside the FIFO is held in its initial state. The FIFO uses edge-triggered D-flops with enable (EN) as storage elements. The data input is sampled by one set of the flops even when WrRst is driven low.

The use of the deskew logic to deskew data between multiple clock groups will now be described in more detail with reference to FIGS. 6, 7 and 8. As described above with reference to FIG. 7, the WrRst signal is not driven low until the transition from the initial value to the initialization pattern of the training sequence is detected. The WrRst signal is then input to the synchronizer and is output as the Ready# signal after a fixed delay.

The amount of this fixed delay is controlled by a value encoded in the DeskewStateDelay[d:0] signal. The actual implementation of the system on a chip may require additional flops to be added between the output of the M stage Synchronizer and the SSPLrx macros thereby inserting additional delay after FIFO initialization requiring more FIFO depth. In this embodiment the DeskewStateDelay[d:0] signal is used to program the Deskew State machine to delay the assertion of WrRst to the input of the Synchronizer. This delayable WrRst signal is denominated as the RdRstSync signal in FIG. 7.

In this embodiment, the Deskew Logic of FIG. 6 includes a one-bit deskew state machine (FIG. 7) for clock group "a" and another one-bit deskew state machine for clock group "b". In this example it is assumed that the data of clock group "a" are delayed relative to the data of clock group "b". As described above, WrRst will be driven low by each one-bit state machine when the transition of the initial value of training sequence is detected. Thus, referring to FIG. 8, the FIFO starts writing the received data when WrRst is driven low. In this case, because of the skew between clock groups "a" and "b", the signal WrRstb will be driven low before the signal WrRsta and data from clock group "b" will be read into the FIFO prior to data from group "a".

The RdRstSync signal is driven low either simultaneously with WrRstA or after a fixed delay. The M stage Synchronizer is driven by the internal clock signal RCC and forms the boundary between the receive clock domain and the internal clock domain. The Ready signal is synchronized to RCC.

In the example currently being described, the signal Ready$_b$ will be driven low before the signal Ready$_a$. However, in this case all FIFO Read Counters receive a RdRst signal which is in the form of the logical OR of all the Ready$_i$ signals driven low by the individual one-bit deskew state machines so that no data will be read from the FIFOs until the initial data of all the clock groups has been written to a corresponding FIFO. The RdRst signal can thus be used to keep all the FIFO read pointers "on hold" until all the groups are initialized and ready to read out data. Accordingly, the RdRst signal will be driven low only after both Ready$_a$ and Ready$_b$ signals are driven low and the first data received on both clock group signals will be read in synchronism from the FIFO when RdRst is driven low and the skew between the clock groups is removed.

In an alternative embodiment, the RdRst signal is derived from the logical AND of the Ready$_a$ and Ready$_b$ signals delayed by S clocks, where an interval of S clock delays is greater than the maximum budgeted skew interval between clock groups. In this case, the RdRst signal will be driven low if any of the Ready signals are driven low. This removes a possible fault where one of the Ready signals getting stuck could hang up the receiver. However, this option adds a delay since the Ready signal will not be driven low until after the S clock delayed expires.

Figure 9:
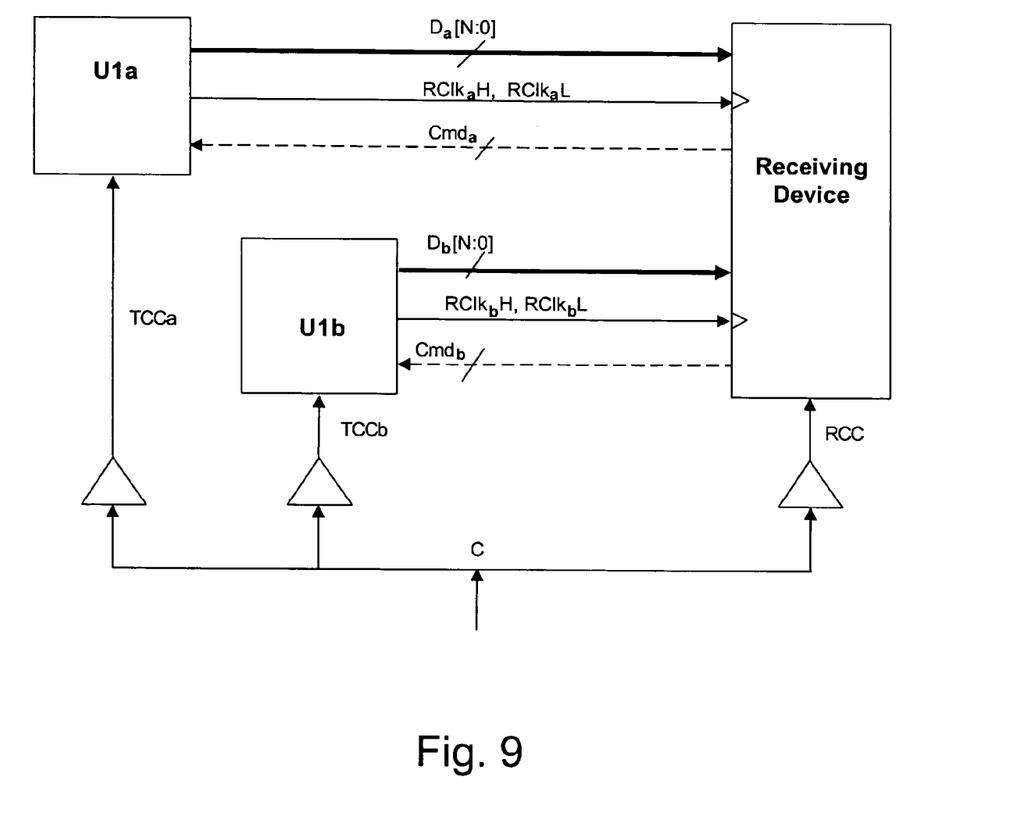
FIG. 9 depicts two transmitters coupled in parallel to a receiver.

FIG. 9 shows a configuration where multiple transmitting devices are connected in parallel. In response to identical commands sent by the receiving device on Cmda and Cmdb bus, U1a and U1b drives different parts of the same dataframe on D$_a$[N:0] and D$_b$[N:0]. The receiving device needs to align the data from U1a and U1b received from two different devices. One or more bits on the SSPL must provide framing information for data-frame driven by the transmitting device. The receiving device can use the framing information to align data from different transmitting devices.

In case the transmitting device has the same latency for all commands, this embodiment provides a mechanism to align data from two transmitting devices. U1a and U1b drive the initialization pattern in response to a "send-initialization-pattern" command from the receiving device. During initialization, the receiving device sends this command simultaneously to both U1$_a$ and U1$_b$. The receiving device then uses the initialization patterns from the two devices to deskew the data from U1$_a$ and U1$_b$ (similarly to how a receiving device deskews data from two clock-groups as described with reference to FIGS. 7-8).

Due to skew between the core-clocks Of U1$_a$ and U1$_b$, the skew between the source-synchronous clocks from two devices can be larger than the skew between two clock-groups from the same device. The SSPL is also used for CmdA and CmdB buses. The synchronizers in the SSPL receiver interface in U1$_a$ and U1$_b$ may skew the commands by an additional period. If the latency of U1$_a$ and U1$_b$ is unequal, the receiving device needs to support additional skew amounting to the latency-difference between U1$_a$ and U1$_b$.

The data in the different SSPLrx modules in the receiving device may be skewed with respect to each other due to:

Skew between Cmd$_a$ and Cmd$_b$ bus clocks

Skew between TCC$_a$ and TCC$_b$

Phase-error and jitter of frequency-synthesizer inside U1$_a$ and U1$_b$

Delay difference between transmitter cores in U1$_a$ and U1$_b$

Delay difference between source-synchronous clocks from U1$_a$ and U1$_b$

Skew between RstIn inputs to SSPLrx modules in the receiving device

Jitter and skew of RCC in receiving device

Figure 10:
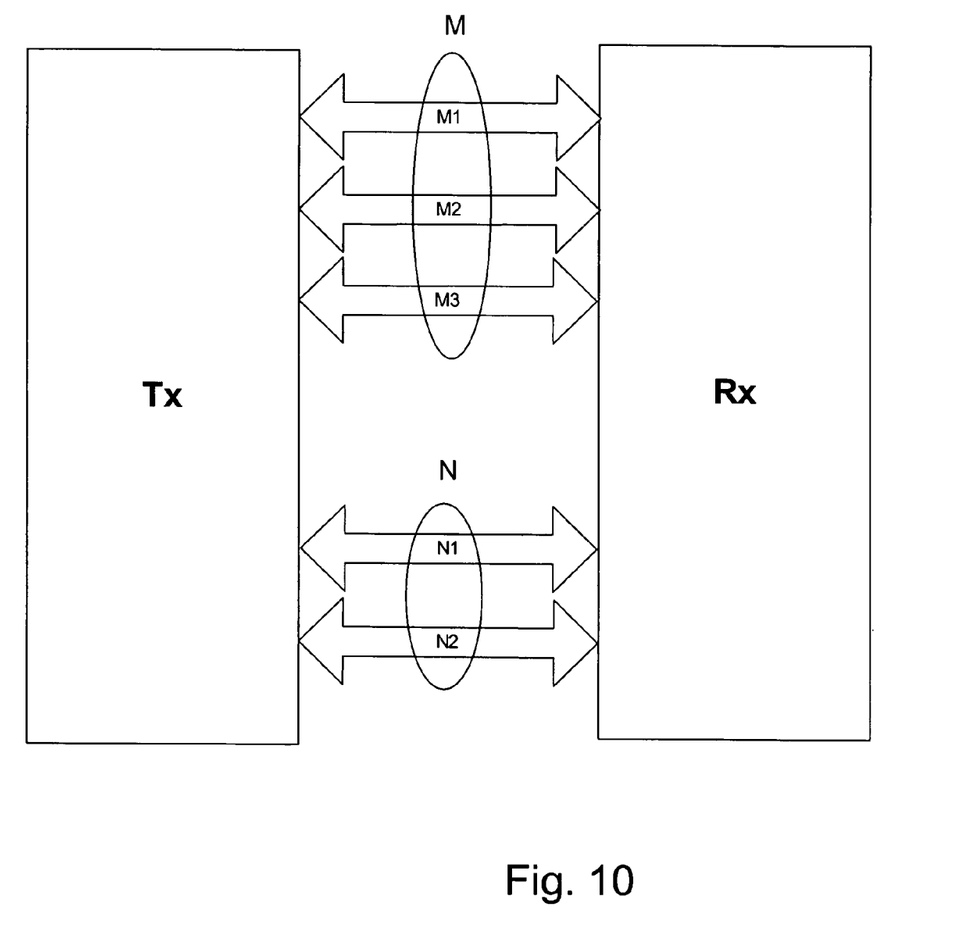
FIG. 10 depicts a transmitter and receiver coupled by independent logical buses divided into clock groups.

In another embodiment the deskew logic deskews independent buses while maintaining the temporal relationship between the data on the buses. For example, FIG. 10 depicts two chips: Tx (transmitter) and Rx (receiver). There are two busses going from T to R, labeled M and N where M has 3 clock groups M1, M2 and M3, and N has 2 clock groups N1 and N2.

The bus M is self-contained and independent of N, meaning all the necessary signaling is present within M so that the core logic in Tx can transfer data through M to core logic in R. Likewise, N is self-contained and independent of M. This means that buses M and N can independently carry two "streams" of data from Tx to Rx. However, there are applications where there is a "temporal" relationship between the data on M and N. For example, an element of data on M (like a packet) may precede an element of data on N (for example, some information related to the previous packet) by a fixed number of core clock periods. The following example illustrates this:

M: XXXXXXXX1234XX56XX7XXXX . . .

N: XXXXXXXXXXXABCDXXEFXGXXX . . .

The data "ABCD" on N follows the data "1234" on M by two clocks (in the transmitter core logic domain). The following is an example of what could happen when these busses go through the SSPL. Assuming M1 has a zero skew, and with respect to M, skew(M1, M2)=2 skew(M1, M3)=4 skew(M1, N1)=4 skew(M1, N2)=5

If M1-M3 and N1-N2 are treated as two busses and grouped separately, then:

the "M" set deskews M1, M2 and M3, and the total delay on M bus on the receiver side would be 4 (due to M3), and the "N" set deskews N1 and N2, and the total delay on N bus on the receiver side would be 5 (due to N2)

this means that the receiver gets data on the N bus later with respect to data on M.

So, the SSPL skews in the "physical layer" (board, IO, etc.) have altered the temporal relationship between data on M and N and the receiver core logic has to have additional logic to handle this.

Instead, in this embodiment M1-M2 and N1-N2 are treated as a single bus in the SSPL domain, so that the total delay on all the groups (M1, M2, M3, N1, N2) would be 5 (due to N2), the temporal relationship between the data on M and N is preserved, and the transmitter core and receiver core remain in sync with respect to M and N regardless of physical layer skews to nicely decouple the logic layer protocols from the physical layer protocols and keep the core logic design "clean" and independent of SSPL skews.

The invention has now been described with reference to the preferred embodiments. Alternatives and substitutions will now be apparent to persons of skill in the art. For example, the logic levels described above are arbitrary and may be varied as is known in the art. Further, the number of data lines in a clock group depends on system design and timing budgets. Accordingly, it is not intended to limit the invention except as provided by the appended claims.

What is claimed is:

1. A system comprising:
a transmitter comprising:
Tx core logic utilizing a transmitter core clock (TCC);
a transmitter interface module adapted to be coupled to a parallel bus, with the parallel bus including first and second clock groups, with each clock group including a set of data lines and an associated clock line, with the data lines and associated clock line in a clock group located physically close to one another to minimize skew between the data signals and the clock signal carried on the lines of the clock group, with the transmitter interface module configured to clock data onto the data lines of the first and second clock groups in synchronism with first and second transmit clock copies, respectively, derived from the TCC, and with the transmitter interface further configured to transmit a single initial value having a first logic value only on a selected data line of each of the first and second clock groups and subsequently to simultaneously transmit a single training sequence value having a second logic value different from the first logic value only on the selected data line in each of the first and second clock groups, where the single initial value and single training sequence value are transmitted only once when the transmitter is initialized;
a receiver comprising:
Rx core logic utilizing a receiver core clock (RCC);
a first deskew state machine adapted to receive the first transmit clock copy and the initial value and training sequence value on the selected data line of the first clock group, with the first deskew state machine adapted to assert a first write restart signal when the training sequence value is received;
a first synchronizer, clocked by the RCC, coupled to receive the first write restart signal and assert a first read ready signal after a delay of a selected number of RCC cycles from the assertion of the first write restart signal;
a second deskew state machine, coupled to receive the second transmit clock copy and the initial value and training sequence value on the selected data line of the second clock group, with the second deskew state machine adapted to assert a second write restart signal when the training sequence value is received where the first and second write restart signals will be asserted at different times if there is skew between the first and second associated clock groups;
a second synchronizer, clocked by RCC, coupled to receive the second write restart signal and assert a second read ready signal after the delay of the selected number of RCC cycles from the assertion of the second write restart signal;
read restart logic, coupled to receive the first and second read ready signals, adapted to assert a read restart signal when both the first and second read ready signals are asserted, where assertion of the read restart signal indicates that both the first and second associated clock groups are initialized and ready to read out data;
a first FIFO having a data input adapted to sample data from the data lines of the first clock group in synchronism with the first transmit clock copy received on the clock line of the first clock group, with the first FIFO including write logic, coupled to the first deskew state machine to receive the first write restart signal, with the write logic configured to start writing data to the first FIFO when the first write restart signal is asserted and the first FIFO including read logic, coupled to the read restart logic to receive the read restart signal, and with the read logic configured to start reading data from the first FIFO when the read restart signal is asserted; and
a second FIFO having a data input adapted to sample data from the data lines of the second clock group in synchronism with the second transmit clock copy received on the clock line of the second clock group, with the second FIFO including write logic, coupled to the second deskew state machine receive the second write restart signal, with the write logic configured to start writing data to the second FIFO when the second write restart signal is asserted and with the second FIFO including read logic, coupled to the read restart logic to receive the read restart signal, with the read logic configured to start reading data from the second FIFO when the read restart signal is asserted where writing data to the first and second FIFOs will begin at different times if the there is skew between the first and second clock groups but reading data will begin at the same time.

2. The system of claim 1 where data is clocked on the rising and falling edges of the transmit clock copy and a positive and negative transmit clock copy are carried on two clock lines of each clock group.

3. The system of claim 1 where the transmitter core clock and receiver core clock are derived from a common clock source signal to reduce jitter.

4. The system of claim 1 where TCC and RCC are not equal.

5. A method comprising:
asserting a first write restart signal when a single training sequence value having a second logic value is received after the receipt of a single initial value having a first logic value is received only on a selected data line of a first clock group of a parallel bus, with the first clock group including data lines and an associated clock signal line and with the single training seguence value and single initial value received only once upon initialization of a transmitter;
starting sampling data on data lines of the first clock group into a first FIFO in synchronism with first FIFO write signals when the first write restart signal is asserted;
asserting a second write restart signal when a training sequence value having a second logic value is received after the receipt of an initial value having a first logic value is received on a selected data line of a second clock group of a parallel bus, with the second clock group including data lines and an associated clock signal line with the data lines and associated clock line in a clock group located physically close to one another to minimize skew between the data signals and the clock signal carried on the lines of the clock group;
starting sampling data on data lines of the second clock group into a second FIFO in synchronism with second FIFO write signals when the second write restart signal is asserted;
delaying the first write ready signal by a fixed number of receiver core clock (RCC) cycles to form a first ready signal;
delaying the second write ready signal by the fixed number of receiver core clock (RCC) cycles to form a second ready signal;
asserting a third read restart signal when both the first and second write ready signals are asserted, where assertion of the read restart signal indicates that both the first and second associated clock groups are initialized and ready to read out data;

starting reading data from the first FIFO in synchronism with the first FIFO read signals when the read restart signal is asserted;

starting reading data from the second FIFO in synchronism with the second FIFO read signals when the read restart signal is asserted where writing data to the first and second FIFOs will begin at different times if the there is skew between the first and second clock groups but reading data will begin at the same time.

6. A system comprising:

means for asserting a first write restart signal when a single training sequence value having a second logic value is received after the receipt of a single initial value having a first logic value is received only on a selected data line of a first clock group of a parallel bus, with the first clock group including data lines and an associated clock signal line and with the single training sequence value and single initial value received only once upon initialization of a transmitter;

means for starting sampling data on data lines of the first clock group into a first FIFO in synchronism with first FIFO write signals when the first write restart signal is asserted;

means for asserting a second write restart signal when a training sequence value having a second logic value is received after the receipt of an initial value having a first logic value is received on a selected data line of a second clock group of a parallel bus, with the second clock group including data lines and an associated clock signal line with the data lines and associated clock line in a clock group located physically close to one another to minimize skew between the data signals and the clock signal carried on the lines of the clock group;

means for starting sampling data on data lines of the second clock group into a second FIFO in synchronism with second FIFO write signals when the second write restart signal is asserted;

means for delaying the first write ready signal by a fixed number of receiver core clock (RCC) cycles to form a first ready signal;

means for delaying the second write ready signal by the fixed number of receiver core clock (RCC) cycles to form a second ready signal;

means for asserting a third read restart signal when both the first and second write ready signals are asserted, where assertion of the read restart signal indicates that both the first and second associated clock groups are initialized and ready to read out data;

means for starting reading data from the first FIFO in synchronism with the first FIFO read signals when the read restart signal is asserted;

means for starting reading data from the second FIFO in synchronism with the second FIFO read signals when the read restart signal is asserted where writing data to the first and second FIFOs will begin at different times if the there is skew between the first and second clock groups but reading data will begin at the same time.

* * * * *